(No Model.)

H. D. GORDON.
CRANK PIN.

No. 406,275. Patented July 2, 1889.

Attest
Joshua Matlack, Jr.
H. W. Ham Powell

Inventor
Henry D. Gordon
by his attorney
Francis T. Chambers

UNITED STATES PATENT OFFICE.

HENRY D. GORDON, OF WILMINGTON, DELAWARE.

CRANK-PIN.

SPECIFICATION forming part of Letters Patent No. 406,275, dated July 2, 1889.

Application filed December 9, 1887. Serial No. 257,381. (No model.)

*To all whom it may concern:*

Be it known that I, HENRY D. GORDON, of Wilmington, county of New Castle, State of Delaware, have invented a new and useful Improvement in Connecting-Pins or Crank-Pins, of which the following is a true and exact description, reference being had to the accompanying drawings, which form a part of this specification.

My invention relates to the construction of such connecting-pins as have removable collars or disks at their ends, and especially to locomotive crank-pins adapted for use with solid-end side rods.

The object of my invention is to secure the collar or disk on the end of the crank-pin or other connecting-pin without the aid of nuts or pins on the outside of the connecting-pin, and to make the removable collar or disk of minimum thickness; and my invention consists, primarily, in the combination of a pin bored out longitudinally with a device for retaining a bar or rod upon the outer end of said pin, said device consisting of a disk or collar fitting against said outer end, and either formed integral with or detached from a bolt-shank adapted to enter and be secured in the perforation formed in the pin, reference being now had to the drawings, which illustrate my invention as applied to the crank-pin of a locomotive-driver, and in which—

Figure 1:
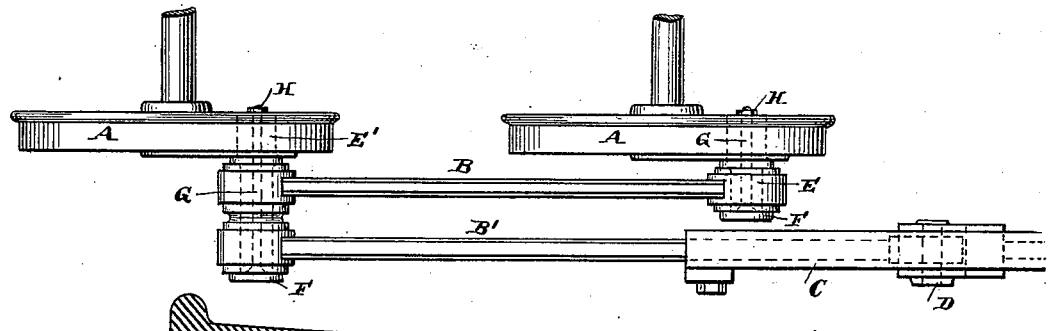
Figure 2:
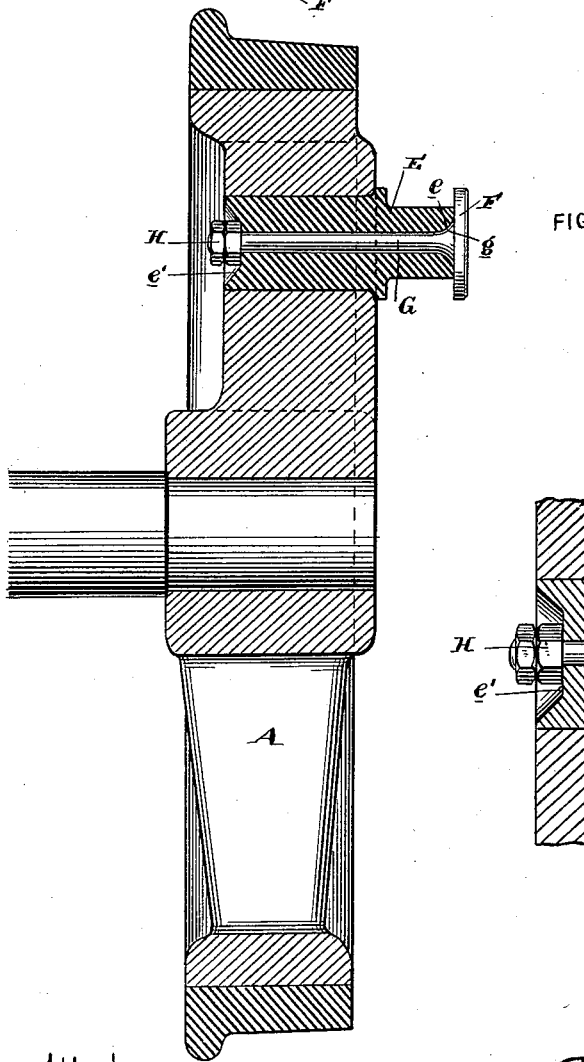
Figure 3:
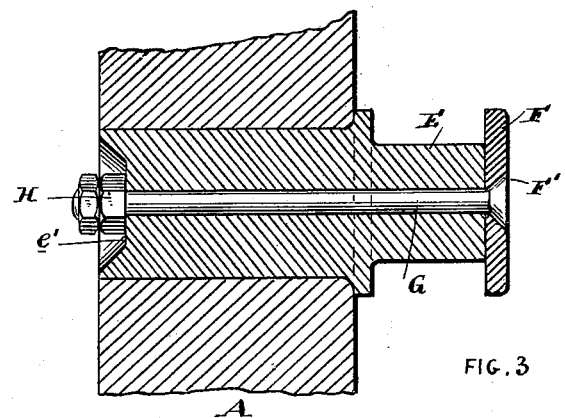

Figure 1 is a plan view of two locomotive-drivers in connection with a cross-head, its guides and connecting-rods. Fig. 2 is an enlarged view of a driver, showing my improvement in section; and Fig. 3 is a sectional view of a modified construction of my improvement.

A A are driving wheels or cranks.

B is the connecting-rod between two drivers; B', the connecting-rod whereby the drivers are actuated by the piston-rod.

C indicates the guides for the cross-head.

D is the cross-head of the piston-rod.

E and E' are crank-pins on the drivers.

For retaining the connecting rod or rods upon the crank-pin I provide a metallic disk of greater diameter than the outer end of the crank-pin, so as to serve as a retaining-collar. This disk is indicated in the several figures by the letter F, and is preferably formed on the bolt-shank, as is shown in Fig. 2, but may be detachably secured to the bolt-shank, as shown in Fig. 3. Each crank-pin is bored out longitudinally, as shown, for the reception of the bolt-shank G, and nuts H are provided for securing the bolt-shank and disk in place.

My preferred construction of disk and bolt-shank is illustrated in Figs. 1 and 2, wherein a fillet $g$ is shown where the disk and bolt-shank unite, the end $e$ of the crank-pin being counterbored to fit the fillet. At the other end $e'$ the crank-pin is also counterbored to prevent the nuts H, which secure the bolt-shank in place, from projecting too far out from the end of the bolt-shank.

In Fig. 3, where I have shown the bolt-shank G and disk F detachably connected, the disk is counterbored to permit a head F' on the bolt-shank to rest in it.

Instead of nuts H, a pin or any of the many well-known devices for securing a pin or bolt in place can of course be used.

My invention is especially adapted for use with locomotive crank-pins, and in cases where the parts of the locomotive are arranged as shown in Fig. 1 its use is almost a necessity if solid-end side rods are used, as it would be difficult to construct the engine so as to permit a projecting nut or thick collar to clear the guides C. It is also highly advantageous to prevent the nuts projecting on the inside of the driver, as I do by means of countersinking the end $e'$ of the pin, and, besides being more compact, I believe my new means of securing the removable disk, or "collar," as it may be called, with reference to its function, is stronger than that heretofore used, and, obviously, it is neater in appearance and more easily kept clean.

While, as I have said, my invention is especially adapted for use with the crank-pins of drivers, it is capable of application to any connecting-pin where a removable collar or disk is used to secure the connecting-rod in place, and will be advantageously used wherever compactness and a smooth finish are desirable.

Having thus fully described my invention, what I claim as new, and desire to secure by Letters Patent, is—

1. The combination, with a connecting-pin bored out longitudinally, of a device for retaining a rod or bar upon the outer end of said pin, said device consisting of a disk fitting against said outer end, a bolt-shank connected integrally with said disk and passing through the bored pin, and means for securing the bolt-shank at the inner end of said pin.

2. The combination, with a crank, of a connecting-pin bored out longitudinally, a device for retaining a rod or bar upon the outer end of said connecting-pin, said device consisting of a disk fitting against said outer end, a bolt-shank connected with said disk and passing through the bored pin, and means for securing the bolt-shank at the inner end of the pin.

3. The combination, with a crank, of a connecting-pin bored out longitudinally and countersunk at its inner end, a device for retaining a rod or bar upon the outer end of said pin, said device consisting of a disk fitting against said outer end, a bolt-shank connected with said disk and passing through the bored pin, and means, located within the countersunk portion of the pin, for securing the bolt-shank.

4. The combination, with a connecting-pin bored out longitudinally and having the hole thus made flared at its outer end, of a device for retaining a rod or bar upon the outer end of the pin, said device consisting of a disk fitting against said outer end, a bolt-shank connected integrally with said disk, said bolt-shank passing through the bored pin and having a fillet adapted to fit the flared end of the pin, and means for securing the bolt-shank at the inner end of the pin.

5. The combination, with a connecting-pin countersunk at its inner end and having a longitudinal aperture flaring at its outer end, of a device for retaining a rod or bar upon the outer end of said pin, said device consisting of a disk fitting against said outer end, a bolt-shank connected integrally with said disk, said bolt-shank passing through the bored pin and having a fillet adapted to fit the flared end of the pin, and means, located within the countersunk portion of the pin, for securing the bolt-shank.

HENRY D. GORDON.

Witnesses:
CHARLES F. ZIEGLER,
T. M. WALLIS.